(12) United States Patent
Kimura

(10) Patent No.: US 7,221,707 B2
(45) Date of Patent: May 22, 2007

(54) IMAGE PROCESSING APPARATUS EMPLOYING HIERARCHICAL ENCODING

(75) Inventor: Tsuyoshi Kimura, Kanagawa (JP)

(73) Assignee: Sony Corporation, Tokyo (JP)

( * ) Notice: Subject to any disclaimer, the term of this patent is extended or adjusted under 35 U.S.C. 154(b) by 760 days.

(21) Appl. No.: 09/924,015

(22) Filed: Aug. 7, 2001

(65) Prior Publication Data

US 2002/0054338 A1   May 9, 2002

(30) Foreign Application Priority Data

Aug. 9, 2000   (JP)   ............ P2000-240824

(51) Int. Cl.
*H04N 7/32*   (2006.01)
(52) U.S. Cl. .................. 375/240.12; 382/236
(58) Field of Classification Search ............ 348/411, 348/394, 415, 410, 416, 402, 407, 420; 375/240.02, 375/240.23, 240.24, 240.16, 240.29; 382/236, 382/107
See application file for complete search history.

(56) References Cited

U.S. PATENT DOCUMENTS 5,541,658 A * 7/1996 Ishiwata ............... 348/394.1
6,011,870 A * 1/2000 Jeng et al. ............ 382/236
6,088,061 A * 7/2000 Katata et al. .......... 348/390.1
6,639,942 B1 * 10/2003 Bayazit ................. 382/232
2001/0043751 A1 * 11/2001 Takahashi et al. ..... 382/240
2002/0057705 A1 * 5/2002 Hagai et al. .......... 370/410
2003/0165274 A1 * 9/2003 Haskell et al. ........ 382/243

* cited by examiner

*Primary Examiner*—Tung Vo
*Assistant Examiner*—Behrooz Senfi
(74) *Attorney, Agent, or Firm*—Frommer Lawrence & Haug LLP; William S. Frommer; Thomas F. Presson

(57) ABSTRACT

When image data to be encoded is divided into image data items in a plurality of hierarchies and an image data item in a given hierarchy among the divided image data items in the plurality of hierarchies is to be encoded as an intra picture, an image encoding apparatus and an image decoding apparatus provided by the invention allow improvement in efficiency of encoding the image data item in the given hierarchy. When input image data is divided into image data items in a plurality of hierarchies for encoding and a higher hierarchy image data item is to be encoded as an intra picture, a control circuit switches a switch so that reference data is supplied to a subtracting circuit. The subtracting circuit subtracts the reference data from the higher hierarchy image data item outputted from a preprocessing circuit. Encoding is performed on the subtraction result of the subtracting circuit, i.e. differential image data.

17 Claims, 12 Drawing Sheets

IMAGE PROCESSING APPARATUS EMPLOYING HIERARCHICAL ENCODING

BACKGROUND OF THE INVENTION

1. Field of the Invention

The present invention relates to an image processing apparatus for encoding image data for compression, and an image processing apparatus for decoding image data encoded for compression.

2. Description of the Related Art

As a conventional image encoding method for performing compression encoding on image data, a bidirectional predictive encoding method is commonly used in MPEG (Moving Picture Experts Group) standard. The bidirectional predictive encoding method employs three types of encoding, namely, intraframe encoding, interframe forward predictive encoding, and bidirectional predictive encoding. Corresponding to these three types of encoding, three image types, i.e. I (intra) pictures, P (predictive) pictures, and B (bidirectionally predictive) pictures, are defined. The P picture and B picture are also referred to as a non-intra picture or an inter picture.

For encoding image data to be encoded as an intra picture, the image data of interest is encoded, for example, within the same frame (or field). On the other hand, for encoding the image data to be encoded as a non-intra picture, differential image data obtained by referring to the past or future frame is encoded.

Further, hierarchical encoding, for example, is used to achieve step-wise improvement in image quality. In the hierarchical encoding method, image data to be encoded is divided into image data items in a plurality of hierarchies, and encoding is performed on the divided image data items in respective hierarchies. Note that the expression "image data items in respective hierarchies" refers to, for example, image data items divided for different frequency components.

FIG. 1 shows a configuration of an image encoding apparatus employing such a hierarchical encoding method. The image encoding apparatus includes a division circuit 170, and encoding circuits 171 and 172. The division circuit 170 is used for dividing an input image data item XX, which is an image data item to be encoded, into image data items in a plurality (two, in this example) of hierarchies (a basic hierarchy image data item X1 and a higher hierarchy image data item X2). The encoding circuit 171 encodes the basic hierarchy image data item X1 provided from the division circuit 170, while the encoding circuit 172 encodes the higher hierarchy image data item X2 provided from the division circuit 170. The encoding circuits 171 and 172 are of the same configuration, and operate in a similar manner, as described hereinafter.

The division circuit 170 includes an image processing circuit 170a and a subtracting circuit 170b. The image processing circuit 170a extracts the basic hierarchy image data item X1, which is an image data item having basic characteristics, from the input image data item XX. The subtracting circuit 170b subtracts the basic hierarchy image data item X1 from the input image data item XX. Note that the basic hierarchy image data item is an image data item that can be viewed as a normal image, and that, for example, has low frequency components in terms of spatial frequency of the image. The higher hierarchy image data item is, for example, an image data item used for obtaining a high quality image and having high frequency components. When the input image data item XX is divided with respect to spatial frequency, the image processing circuit 170a is formed by, for example, an LPF (low pass filter) circuit.

The input image data item XX is supplied to the image processing circuit 170a and the subtracting circuit 170b in the division circuit 170. The image processing circuit 170a extracts the basic hierarchy image data item X1 from the input image data item XX, and supplies the extracted basic hierarchy image data item X1 to the encoding circuit 171 and the subtracting circuit 170b.

The subtracting circuit 170b subtracts the basic hierarchy image data item X1, which is supplied from the image processing circuit 170a, from the input image data item XX, and provides the subtraction result, i.e. differential image data, to the encoding circuit 172 as the higher hierarchy image data item X2.

FIG. 2 shows a configuration of the encoding circuits 171 and 172 shown in FIG. 1. The encoding circuits 171 and 172 are of the identical configuration and operate in a similar manner, as described above, except that different image data items to be encoded are supplied, namely, the basic hierarchy image data item X1 and the higher hierarchy image data item X2.

The encoding circuit shown in FIG. 2 includes a preprocessing circuit 151, a subtracting circuit 152, a DCT (discrete cosine transform) circuit 153, and a quantization circuit 154. The preprocessing circuit 151 rearranges image data items in, for example, a raster scan form in a predetermined order for an encoding process, and converts each of the rearranged image data items into a block scan form, thereby obtaining image data items in a plurality of macro blocks (hereinafter referred to as block data items). The subtracting circuit 152 subtracts, for example, a predictive image data described hereinafter from the image data (block data) supplied from the preprocessing circuit 151. The DCT circuit 153 converts the image data into frequency components, and performs DCT on the subtraction result supplied from the subtracting circuit 151 to acquire a DCT coefficient. The quantization circuit 154 quantizes the DCT coefficient supplied from the DCT circuit 153 based on a predetermined quantization value.

The encoding circuit further includes an inverse quantization circuit 158, an inverse DCT circuit 159, an addition circuit 160, and a frame memory 161. The inverse quantization circuit 158 inversely quantizes the data supplied from the quantization circuit 154. The inverse DCT circuit 159 performs an inverse DCT on the data supplied from the inverse quantization circuit 158 (the restored DCT coefficient). The addition circuit 160 adds the data supplied from the inverse DCT circuit 159 (image data) and predictive image data. The frame memory 161 stores the addition result of the addition circuit 160 as reference image data.

The encoding circuit further includes a motion compensation circuit 162, a motion vector detecting circuit 163, a switch 164, and a control circuit 166. The motion vector detecting circuit 163 detects a motion vector based on the image data output from the preprocessing circuit 151 and the reference image data stored in the frame memory 161. The motion compensation circuit 162 performs motion compensation on the reference image data stored in the frame memory 161 based on the motion vector detected by the motion vector detecting circuit 163 to generate reference image data for motion compensation as predictive image data.

The control circuit 166 determines whether or not to encode the image data supplied from the preprocessing circuit 151 as an intra picture, and switches the switch 164 based on the determined result.

When the control circuit 166 determines to encode the image data supplied from the preprocessing circuit 151 as an intra picture, the switch 164 is switched to supply data "0" to the subtracting circuit 152 and the addition circuit 160 based on a switching signal applied from the control circuit 166. On the other hand, when the control circuit 166 determines to encode the image data supplied from the preprocessing circuit 151 as a non-intra picture, the switch 164 is switched to supply the predictive image data generated by the motion compensation circuit 162 to the subtracting circuit 152 and the addition circuit 160 based on the switching signal applied from the control circuit 166.

Consequently, the subtraction result supplied from the subtracting circuit 152 is the image data itself when the image data is encoded as an intra picture, and is the differential image data obtained by using the predictive image data when the image data is encoded as a non-intra picture.

The encoding circuit further includes a variable length encoding circuit 155, a multiplexing circuit 156, a buffer 157, and a rate control circuit 165. The variable length encoding circuit 155 performs variable length encoding on the data supplied from the quantization circuit 154. The multiplexing circuit 156 multiplexes encoded data supplied from the variable length encoding circuit 155 (such as a DCT coefficient, a quantization value supplied from the quantization circuit 154, a picture type, and the like), the motion vector, and the like. The buffer 157 temporarily holds the data supplied from the multiplexing circuit 156, and supplies the data as a stream at a predetermined bit rate. The rate control circuit 165 monitors the data occupation state in the buffer 157, and controls the quantization value of the quantization circuit 154 in accordance with the data occupation state.

FIG. 3 is a flowchart of the encoding process performed in the variable length encoding circuit 155 shown in FIG. 2. As shown in FIG. 3, the picture type of the data (which is block data, the quantized DCT coefficient) supplied to the variable length encoding circuit 155 is determined at a step A1. When the supplied data is determined as relating to a non-intra picture, an encoding process is performed using a preset non-intra picture encoding table at a step A2 (encoding process 3).

On the other hand, when the supplied data is determined as relating to an intra picture at the step A1, the DCT coefficient type of the supplied data is determined at a step 3. This is because the DCT coefficients in respective block data items include a DC (direct current) coefficient unchanged in the block data, and an AC (alternate current) coefficient changed in the block data, and an encoding process is performed distinctively for these coefficients.

When the DCT coefficient type is determined as a DC coefficient at the step A3, an encoding process is performed using a DC coefficient encoding table preset for a differential value between the DC coefficient and that of an adjacent block data item (encoding process 1) at a step A4. On the other hand, when the DCT coefficient type is determined as an AC coefficient at the step A3, an encoding process is performed using a preset AC coefficient encoding table at a step A5 (encoding process 2).

In encoding the image data supplied to the encoding circuits 171 and 172 as an intra picture in the image encoding apparatus of the hierarchical encoding type configured as described above, motion compensation, for example, has not been performed. This is because the characteristics of the image greatly differ depending on whether the image data is encoded as a non-intra picture or an intra picture. As a result, the supplied image data itself is encoded for intra pictures, in contrast to the non-intra pictures for which differential image data having a smaller amount of data component is encoded.

In the encoding circuits 171 and 172, encoding is not performed distinctively for the input image data items (basic hierarchy image data item and higher hierarchy image data item). However, as the higher hierarchy image data is differential image data indicating the difference between the input image data and the basic hierarchy image data, the higher hierarchy image data of an intra picture closely resembles the higher hierarchy image data of a non-intra picture. Therefore, encoding the higher hierarchy image data as an intra picture without obtaining differential image data by, for example, motion compensation results in a greater encoding amount of the higher hierarchy image data, although the data component of the higher hierarchy image data is relatively smaller in amount than that of the basic hierarchy image data, leading to a decrease in encoding efficiency.

SUMMARY OF THE INVENTION

The present invention has been conceived in view of the above problems, and an object thereof is to provide an image processing apparatus achieving, when image data to be encoded is divided into image data items in a plurality of hierarchies and an image data item in a given hierarchy among the divided image data items in the plurality of hierarchies is to be encoded as an intra picture, improvement in efficiency of encoding the image data item in the given hierarchy.

An image processing apparatus according to the present invention comprises: specific hierarchy encoding means for encoding a specific hierarchy image data item, among image data items in respective hierarchies produced by dividing image data to be encoded, by performing an encoding process for an intra picture, or an encoding process for a non-intra picture; and control means for controlling the encoding process performed by the specific hierarchy encoding means; wherein, when the encoding process for the intra picture is to be performed, the specific hierarchy encoding means performs the encoding process for the intra picture after subtracting reference data having a value other than zero from the specific hierarchy image data item.

An image processing apparatus according to the present invention comprises: determination means for determining whether a specific hierarchy encoded data item, encoded by performing an encoding process for an intra picture or an encoding process for a non-intra picture on a specific hierarchy image data item among image data items in respective hierarchies produced by dividing image data to be encoded, is encoded by performing the encoding process for the intra picture or the encoding process for the non-intra picture; and specific hierarchy decoding means for decoding the specific hierarchy image data item from the specific hierarchy encoded data item based on a result of determination by the determination means; wherein, when a decoding process for the intra picture is to be performed, the specific hierarchy decoding means performs the decoding process on the specific hierarchy encoded data item using reference data having a value other than zero.

An image processing method according to the present invention comprises the steps of: dividing image data to be encoded to produce image data items in respective hierarchies; and encoding a specific hierarchy image data item among the image data items in respective hierarchies by performing an encoding process for an intra picture or an encoding process for a non-intra picture; wherein, when the encoding process for the intra picture is to be performed, the encoding process for the intra picture is performed in the encoding step after subtracting reference data having a value other than zero from the specific hierarchy image data item.

An image processing method according to the present invention comprises the steps of: determining whether a specific hierarchy encoded data item, encoded by performing an encoding process for an intra picture or an encoding process for a non-intra picture on a specific hierarchy image data item among image data items in respective hierarchies produced by dividing image data to be encoded, is encoded by performing the encoding process for the intra picture or the encoding process for the non-intra picture; and decoding the specific hierarchy image data item from the specific hierarchy encoded data item based on a result of determination in the determining step; wherein, when a decoding process for the intra picture is to be performed, in the step of decoding the specific hierarchy image data item the decoding process is performed on the specific hierarchy encoded data item using reference data having a value other than zero.

Other and further objects, features and advantages of the invention will appear more fully from the following description.

DETAILED DESCRIPTION OF THE PREFERRED EMBODIMENTS

Preferred embodiments of the invention will now be described in detail with reference to the accompanying drawings.

[First Embodiment]

Figure 1:
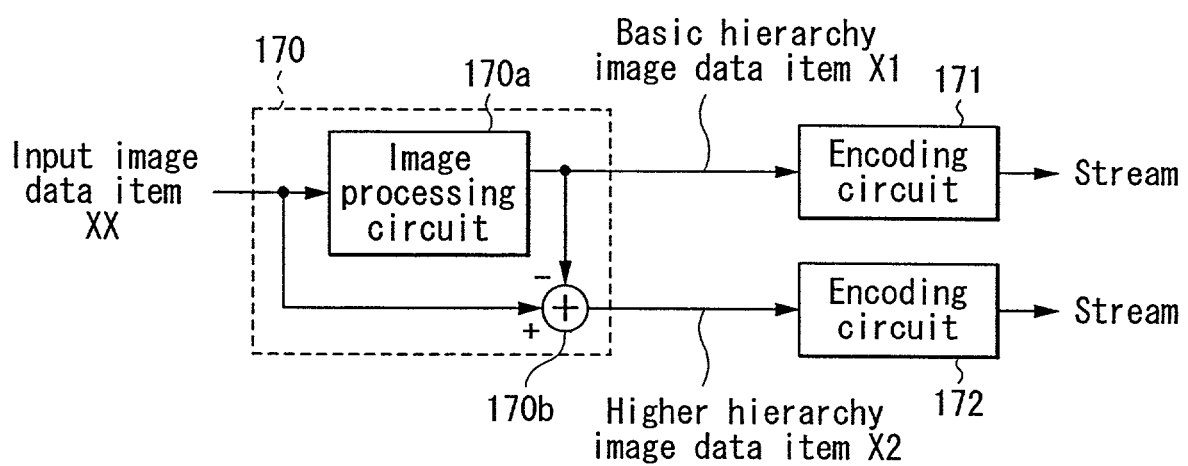
FIG. 1 is a block diagram illustrating a configuration of an image encoding apparatus in accordance with a conventional hierarchical encoding method.
Figure 2:
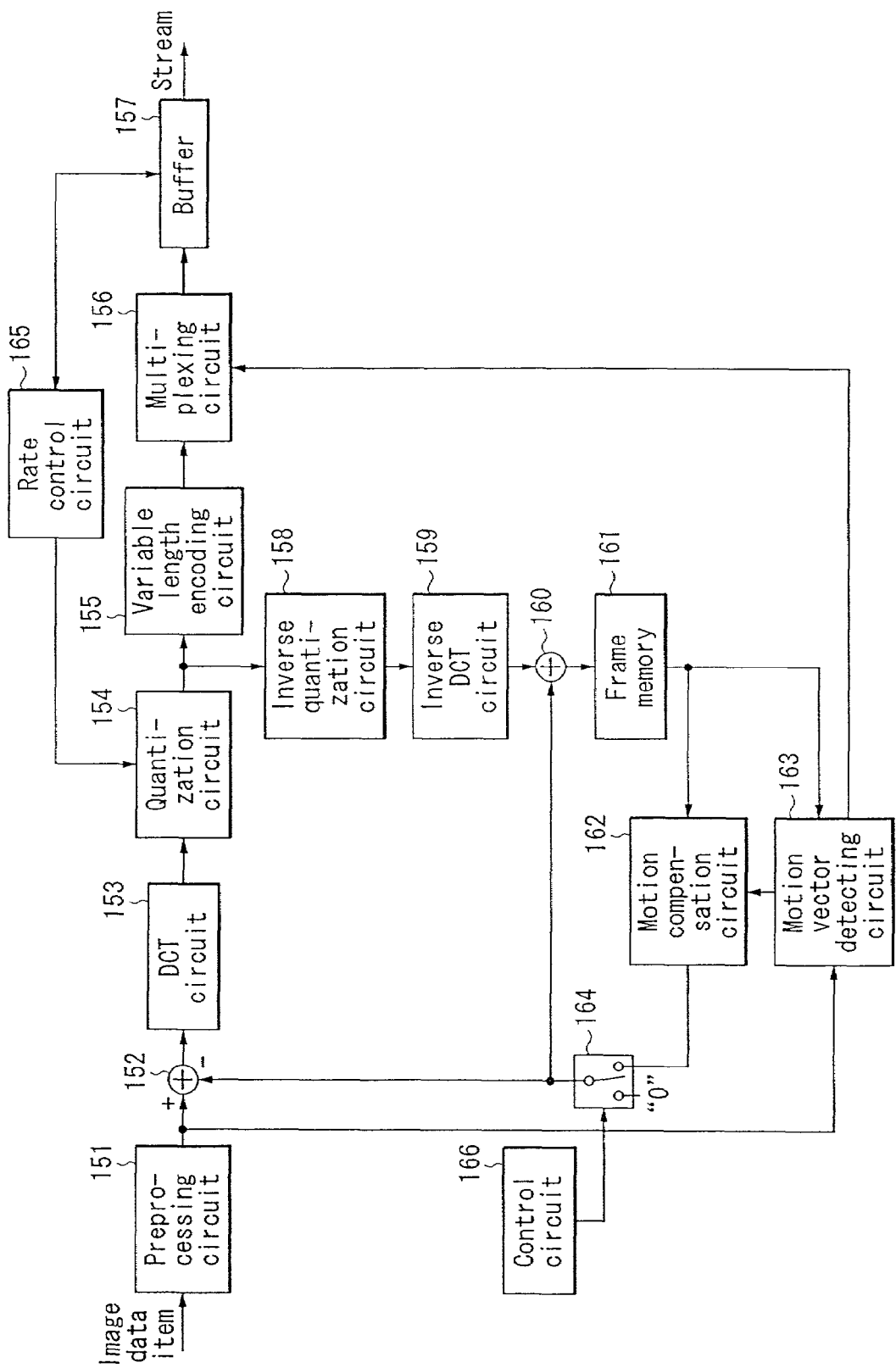
FIG. 2 is a block diagram illustrating a configuration of an encoding circuit illustrated in FIG. 1.
Figure 3:
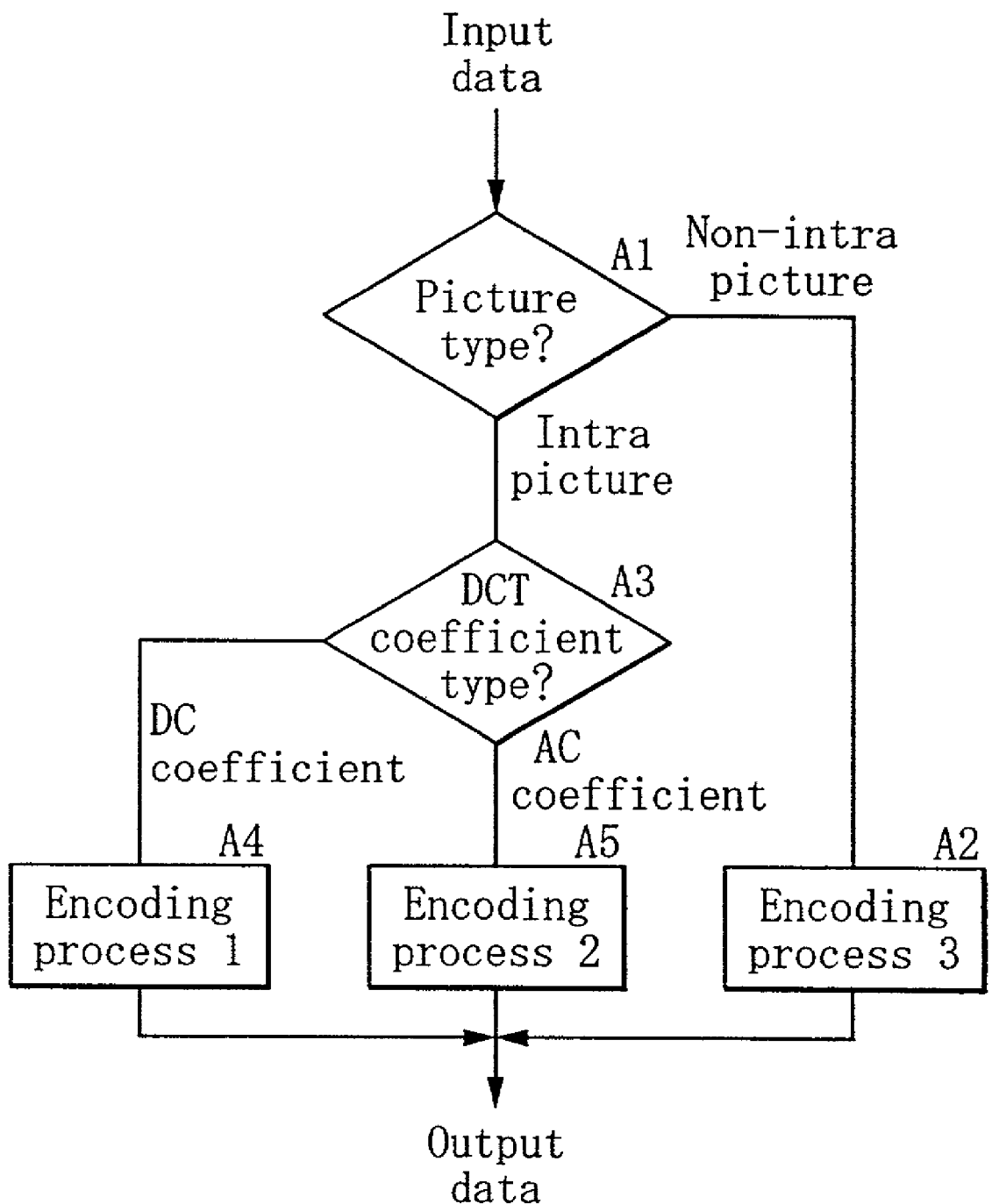
FIG. 3 is a flowchart of an encoding process performed by a variable length encoding circuit illustrated in FIG. 2.
Figure 4:
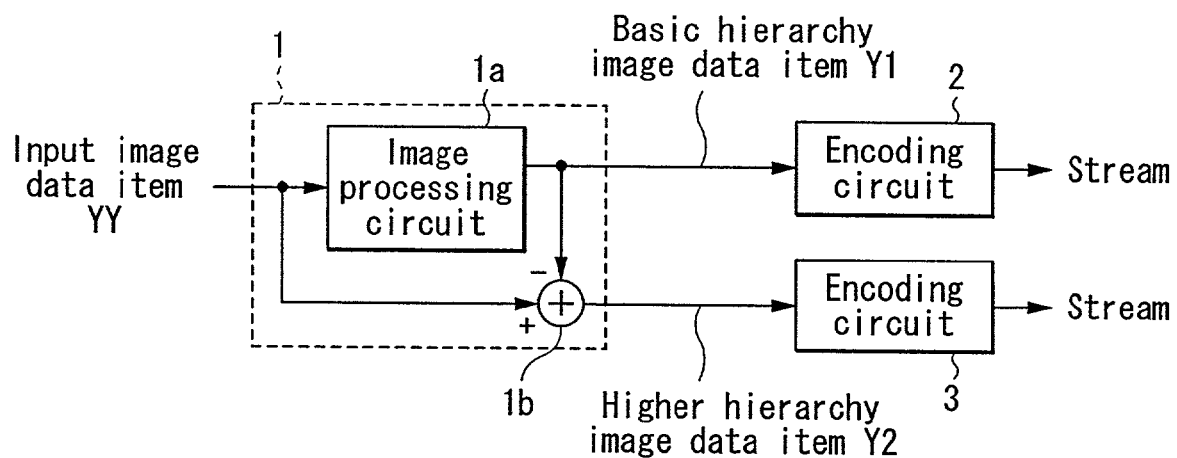
FIG. 4 is a block diagram illustrating a configuration of an image encoding apparatus in accordance with a hierarchical encoding method according to a first embodiment of the invention.
Figure 5:
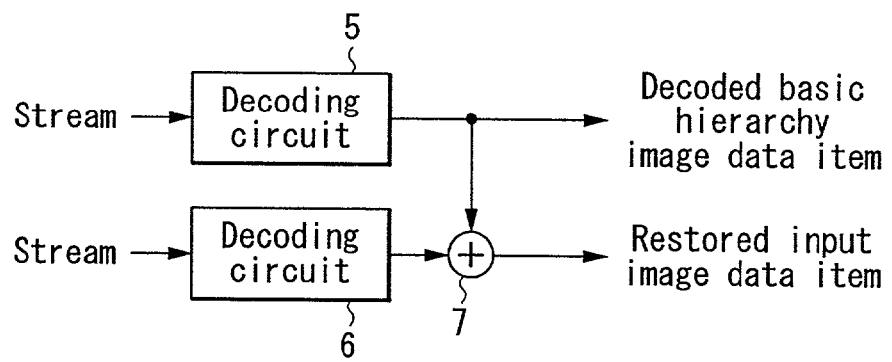
FIG. 5 is a block diagram illustrating a configuration of an image decoding apparatus in accordance with the hierarchical encoding method according to the first embodiment of the invention.

FIG. 4 illustrates a configuration of an image encoding apparatus according to the present embodiment, and FIG. 5 illustrates a configuration of an image decoding apparatus according to the present embodiment.

An image processing apparatus of the present embodiment is configured by the image encoding apparatus and the image decoding apparatus illustrated in FIG. 4 and FIG. 5, respectively.

The image encoding apparatus illustrated in FIG. 4 will be first described. This image encoding apparatus includes a division circuit 1, and encoding circuits 2 and 3.

The division circuit 1 includes an image processing circuit 1a and a subtracting circuit 1b, and divides an input image data item YY as image data to be encoded into image data items in a plurality (two in this example) of hierarchies (a basic hierarchy image data item Y1 and a higher hierarchy image data item Y2). When the input image data item YY is divided with respect to spatial frequency, the image processing circuit 1a is formed by, for example, an LPF circuit.

The input image data item YY is supplied to the image processing circuit 1a and the subtracting circuit 1b provided in the division circuit 1. The image processing circuit 1a extracts the basic hierarchy image data item Y1, which is an image data item having basic characteristics, from the input image data item YY, and supplies the extracted data item Y1 to the encoding circuit 2 and the subtracting circuit 1b.

The subtracting circuit 1b subtracts the basic hierarchy image data item Y1 supplied from the image processing circuit 1a from the input image data item YY, and supplies the subtraction result, i.e. differential image data, to the encoding circuit 3 as the higher hierarchy image data item Y2.

The encoding circuit 2 serves to encode the basic hierarchy image data item Y1, and is configured similarly to the encoding circuits 171 and 172 to operate in a similar manner.

Figure 6:
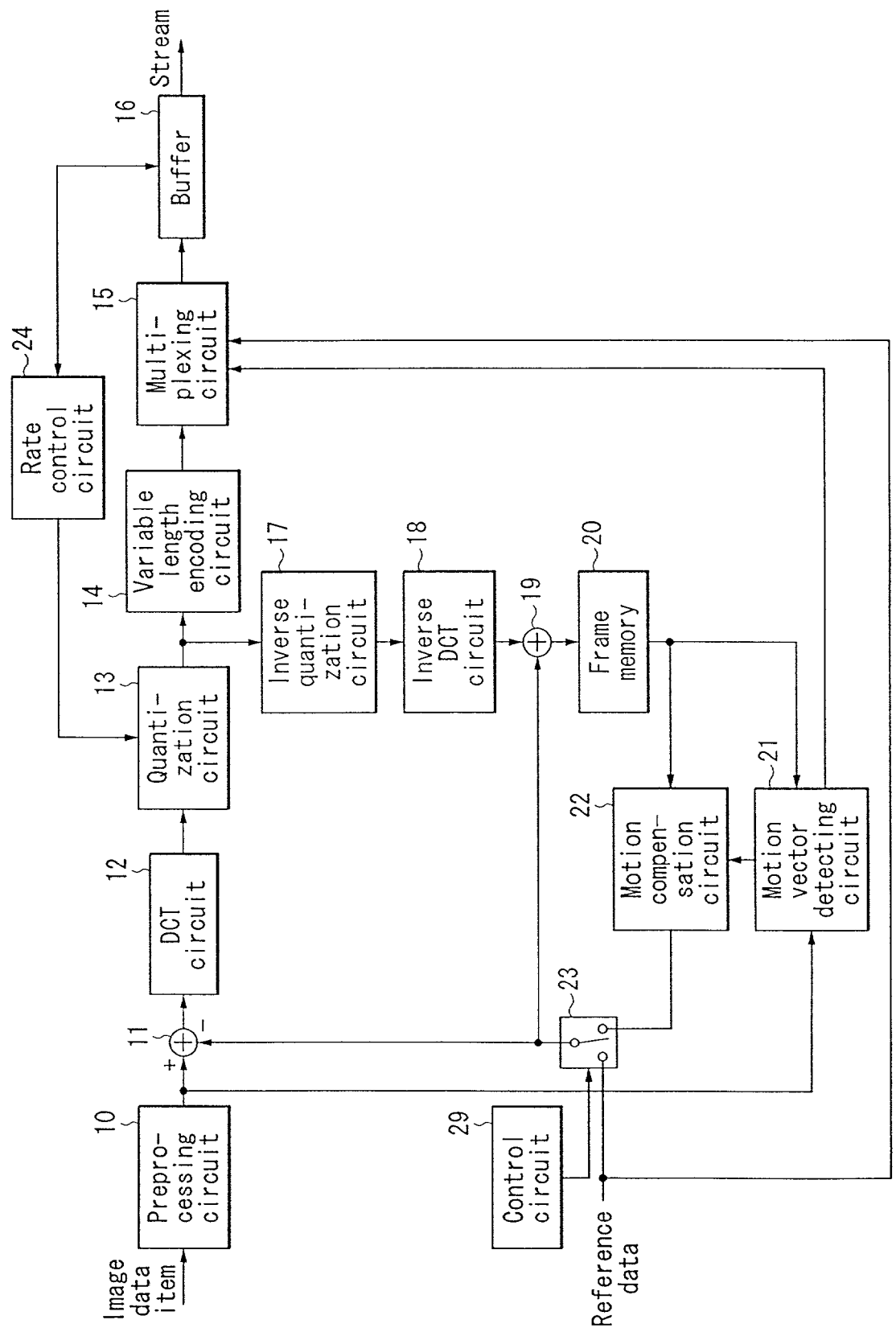
FIG. 6 is a block diagram illustrating a configuration of an encoding circuit illustrated in FIG. 4.

FIG. 6 illustrates a configuration of the encoding circuit 3 shown in FIG. 4. The encoding circuit 3 encodes the higher d hierarchy image data item Y2, and includes a preprocessing circuit 10, a subtracting circuit 11, a DCT circuit 12, and a quantization circuit 13. The preprocessing circuit 10 rearranges image data in, for example, a raster scan form in a predetermined order for encoding process, and converts each of the rearranged image data items in a block scan form to produce a plurality of block data items. The subtracting circuit 11 subtracts, for example, predictive image data described hereinafter from the image data (block data) outputted from the preprocessing circuit 10. The DCT circuit 12 performs DCT on the subtraction result supplied from the subtracting circuit 11, thereby acquiring a DCT coefficient. The quantization circuit 13 quantizes the DCT coefficient supplied from the DCT circuit 12 based on a quantization value.

The encoding circuit 3 further includes an inverse quantization circuit 17, an inverse DCT circuit 18, an addition circuit 19, and a frame memory 20. The inverse quantization circuit 17 performs inverse quantization on the data supplied from the quantization circuit 13. The inverse DCT circuit 18 performs inverse DCT on the data (restored DCT coefficient) supplied from the inverse quantization circuit 17. The addition circuit 19 adds the data (image data) supplied from the inverse DCT circuit 18 and the predictive image data. The frame memory 20 stores the addition result of the addition circuit 19 as reference image data.

The encoding circuit 3 further includes a motion vector detecting circuit 21, a motion compensation circuit 22, a switch 23, and a control circuit 29. The motion vector detecting circuit 21 detects a motion vector based on the image data supplied from the preprocessing circuit 10 and the reference image data stored in the frame memory 20. The motion compensation circuit 22 performs motion compensation on the reference image data stored in the frame memory 20 based on the motion vector detected by the motion vector detecting circuit 21 to generate the reference image data for motion compensation as predictive image data.

The control circuit 29 determines whether or not to encode the image data supplied from the preprocessing circuit 10 as an intra picture, and switches the switch 23 based on the determination result.

When the control circuit 29 determines to encode the image data supplied from the preprocessing circuit 10 as an intra picture, the switch 23 is switched to supply reference data indicative of an externally supplied value (not zero) to the subtracting circuit 11 and the addition circuit 19 based on a switching signal supplied from the control circuit 29. This value is selected to result in the minimum encoding amount when the image data is encoded. On the other hand, when the control circuit 29 determines to encode the image data supplied from the preprocessing circuit 10 as a non-intra picture, the switch 23 is switched to supply the predictive image data generated by the motion compensation circuit 22 to the subtracting circuit 11 and the addition circuit 19 based on the switching signal supplied from the control circuit 29.

Consequently, the subtraction result supplied from the subtracting circuit 11 is differential image data obtained by using the reference data when the image data is encoded as an intra picture, and is differential image data obtained by using predictive image data when the image data is encoded as a non-intra picture.

The encoding circuit 3 further includes a variable length encoding circuit 14, a multiplexing circuit 15, a buffer 16, and a rate control circuit 24. The variable length encoding circuit 14 performs the same variable length encoding process on the data supplied from the quantization circuit 13 regardless of the picture type of the image data applied to the preprocessing circuit 10, i.e. whichever the supplied image data is encoded as an intra picture or a non-intra picture.

The multiplexing circuit 15 multiplexes encoded data supplied from the variable length encoding circuit 14 (such as the DCT coefficient, the quantization value of the quantization circuit 13, the picture type, and the like), the motion vector, the reference data, and the like. The buffer 16 temporarily holds the data supplied from the multiplexing circuit 15, and applies it as a stream at a predetermined bit rate. The rate control circuit 24 monitors the data occupation state in the buffer 16, based on the state the quantization value of the quantization circuit 13 is controlled.

Next, the operation of the image encoding apparatus configured as set forth above will be described.

Figure 7:
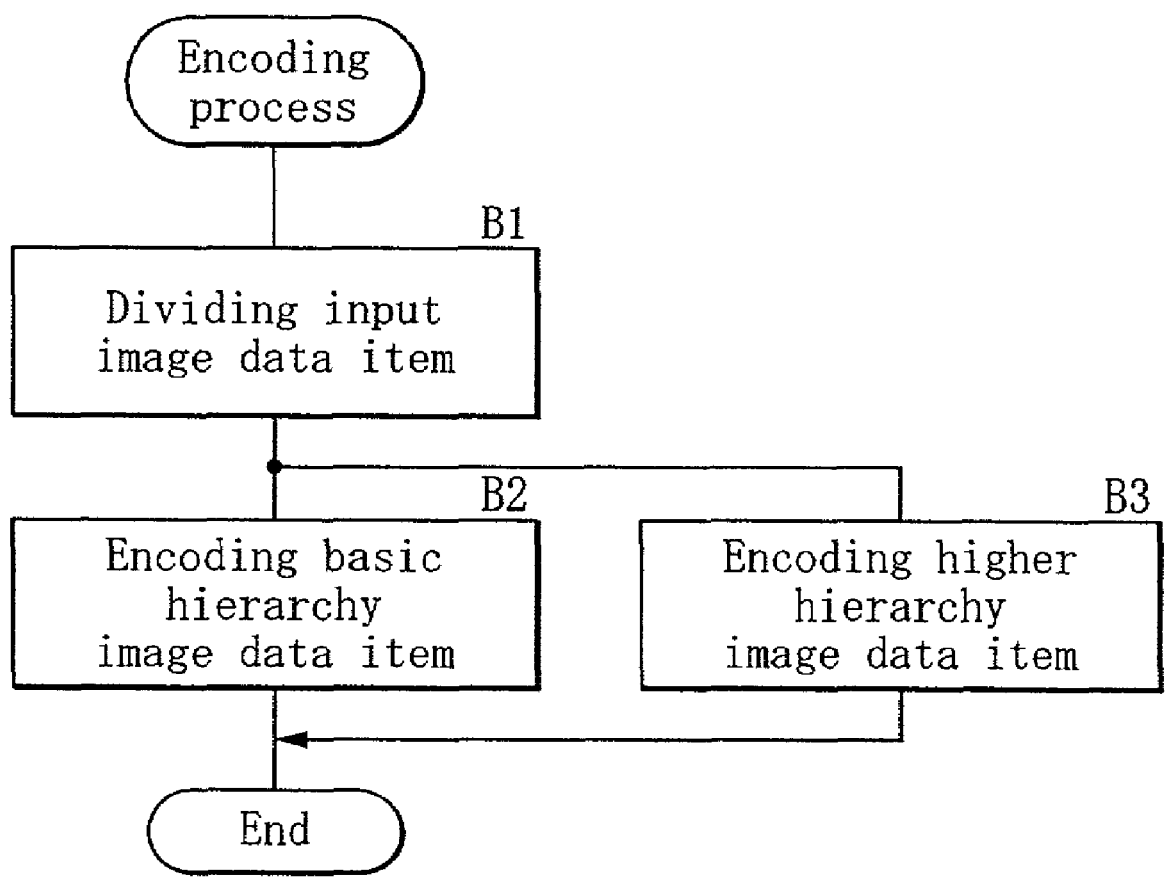
FIG. 7 is a flowchart of an encoding process performed by the image encoding apparatus illustrated in FIG. 4.

FIG. 7 is a flowchart of an encoding process performed by the image encoding apparatus illustrated in FIG. 4. When the input image data item YY, which is the image data to be encoded, is supplied to the division circuit 1, the input image data item YY is divided into the basic hierarchy image data item Y1 and the higher hierarchy image data item Y2 by the division circuit 1 at a step B1. The division circuit 1 then provides the basic hierarchy image data item Y1 and the higher hierarchy image data item Y2 to the encoding circuits 2 and 3, respectively.

At a step B2, the encoding circuit 2 operates similarly to the conventional encoding circuits 171 and 172 to encode the basic hierarchy image data item Y1. More specifically, when the basic hierarchy image data item Y1 supplied from the division circuit 1 is to be encoded as an intra picture, the encoding circuit 2 encodes the basic hierarchy image data item Y1. On the other hand, when the basic hierarchy image data item Y1 is to be encoded as a non-intra picture, the encoding circuit 2 encodes the differential image data item obtained by using the basic hierarchy image data item Y1 and the predictive image data item.

Meanwhile, at a step B3, the encoding circuit 3 encodes the higher hierarchy image data item Y2 supplied from the division circuit 1 in the following manner.

The preprocessing circuit 10 rearranges the supplied higher hierarchy image data items Y2 in a predetermined encoding order, and converts each of the rearranged higher hierarchy image data items Y2 into a plurality of block data items. The motion vector detecting circuit 21 detects a motion vector based on the higher hierarchy image data item Y2 supplied from the preprocessing circuit 10 and the reference image data stored in the frame memory 20. The motion compensation circuit 22 performs motion compensation on the reference image data based on the motion vector detected by the motion vector detecting circuit 21.

When the higher hierarchy image data item Y2 is determined to be encoded as a non-intra picture, the control circuit 29 switches the switch 23 so that the reference image data generated by the motion compensation circuit 22 is supplied to the subtracting circuit 11 as predictive image data.

On the other hand, when the higher hierarchy image data item Y2 is determined to be encoded as an intra picture, the control circuit 29 switches the switch 23 so that the externally supplied reference data is supplied to the subtracting circuit 11.

The subtracting circuit 11 subtracts either the predictive image data or the reference data from the higher hierarchy image data item Y2, and provides the subtraction result (differential image data) to the DCT circuit 12, which acquires a DCT coefficient by performing DCT on the subtraction result provided from the subtracting circuit 11. The quantization circuit 13 quantizes the DCT coefficient acquired by the DCT circuit 12, and supplies the quantized DCT coefficient to the variable length encoding circuit 14 and the inverse quantization circuit 17. The rate control circuit 24 monitors the data occupation state in the buffer 16, and controls the quantization value of the quantization circuit 13 based on the data occupation state.

The inverse quantization circuit 17 performs inverse quantization on the DCT coefficient quantized by the quantization circuit 13. The inverse DCT circuit 18 performs inverse DCT on the DCT coefficient inversely quantized by the inverse quantization circuit 17, thereby restoring the image data. The addition circuit 19 adds the restored image data and either the predictive image data or the reference data. The frame memory 20 stores the addition result of the addition circuit 19 as reference image data.

The variable length encoding circuit 14 encodes the DCT coefficient quantized by the quantization circuit 13 based on a predetermined encoding process regardless of the picture type of the higher hierarchy image data item Y2. The multiplexing circuit 15 multiplexes encoded data supplied from the variable length encoding circuit 14 (such as the DCT coefficient, the quantization value of the quantization circuit 13, the picture type, and the like), the motion vector, the reference data, and the like. The buffer 16 temporarily holds the multiplexed data, and applies it as a stream at a predetermined bit rate.

An image decoding apparatus for decoding the image data encoded as described above will be described in the following.

The image decoding apparatus illustrated in FIG. 5 includes decoding circuits 5 and 6, and an addition circuit 7. The decoding circuit 5 decodes the stream for the encoded basic hierarchy image data item Y1, while the decoding circuit 6 decodes the stream for the encoded higher hierarchy image data item Y2. The addition circuit 7 adds the basic hierarchy image data item Y1 decoded by the decoding circuit 5 and the higher hierarchy image data item Y2 decoded by the decoding circuit 6, and restores the addition result as the input image data item YY.

Figure 8:
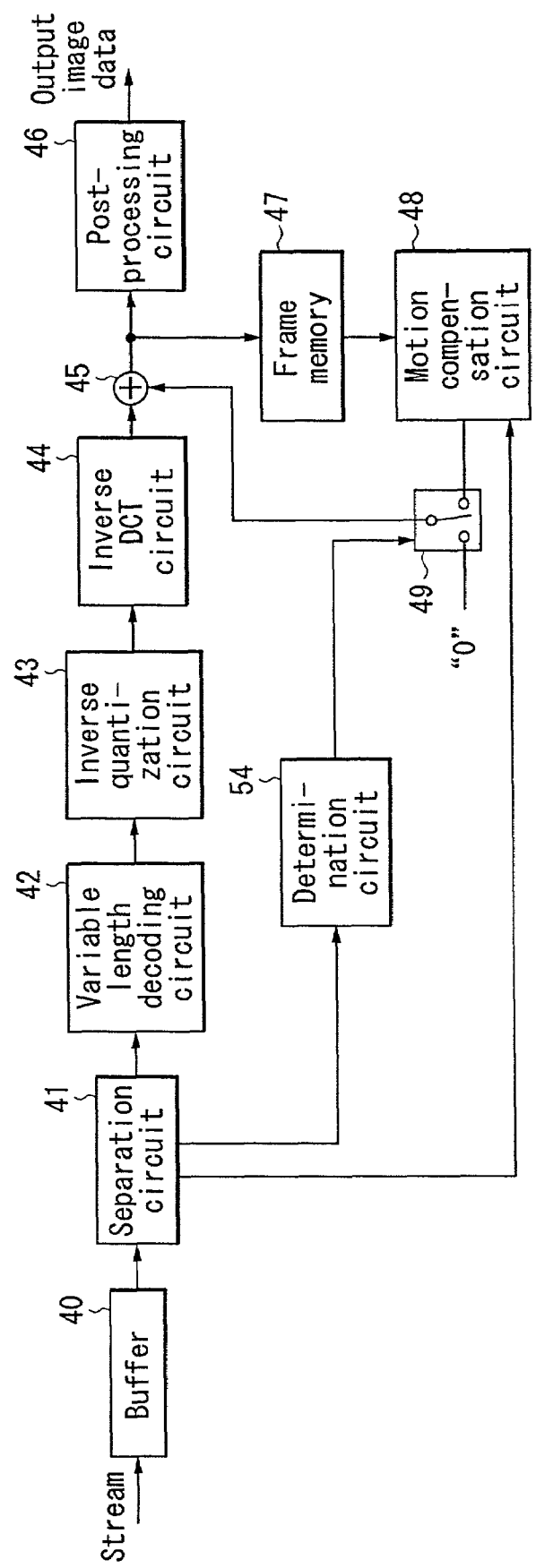
FIG. 8 is a block diagram illustrating a configuration of a decoding circuit illustrated in FIG. 5.

FIG. 8 illustrates a configuration of the decoding circuit 5 illustrated in FIG. 5. The decoding circuit 5 includes a buffer 40, a separation circuit 41, a variable length decoding circuit 42, an inverse quantization circuit 43, and an inverse DCT circuit 44. The buffer 40 temporarily holds the stream for the encoded basic hierarchy image data item Y1. The stream includes encoded data (the DCT coefficient, the quantization value, and the picture type), the motion vector, and the like. The separation circuit 41 separates the stream held in the buffer 40. The variable length decoding circuit 42 performs variable length decoding on the encoded data separated by the separation circuit 41. The inverse quantization circuit 43 performs inverse quantization on the data supplied from the variable length decoding circuit 42. The inverse DCT circuit 44 performs inverse DCT on the data supplied from the inverse quantization circuit 43.

The decoding circuit 5 further includes an addition circuit 45, a frame memory 47, a motion compensation circuit 48, a switch 49, and a determination circuit 54. The addition circuit 45 adds the data outputted from the inverse DCT circuit 44 and the predictive image data. The frame memory 47 stores the addition result of the addition circuit 45 as reference image data. The motion compensation circuit 48 performs motion compensation on the reference image data stored in the frame memory 47 based on the motion vector separated by the separation circuit 41, and generates the reference image data for motion compensation as predictive image data. The determination circuit 54 determines the picture type (the intra picture or the non-intra picture) separated by the separation circuit 41, and switches the switch 49 based on the determined result.

When the determination circuit 54 determines that the encoded basic hierarchy image data item Y1 is an intra picture, the switch 49 is switched to output data "0" to the addition circuit 45 based on a switching signal supplied from the determination circuit 54. On the other hand, when the determination circuit 54 determines that the encoded basic hierarchy image data item Y1 is a non-intra picture, the switch 49 is switched to output the predictive image data generated by the motion compensation circuit 48 to the addition circuit 45 based on the switching signal supplied from the determination circuit 54.

The decoding circuit 5 further includes a post-processing circuit 46 for converting the block data in the block scan form, which is the addition result supplied from the addition circuit 45, to image data in the raster scan form, and rearranging and supplying the converted image data in a predetermined order.

Figure 9:
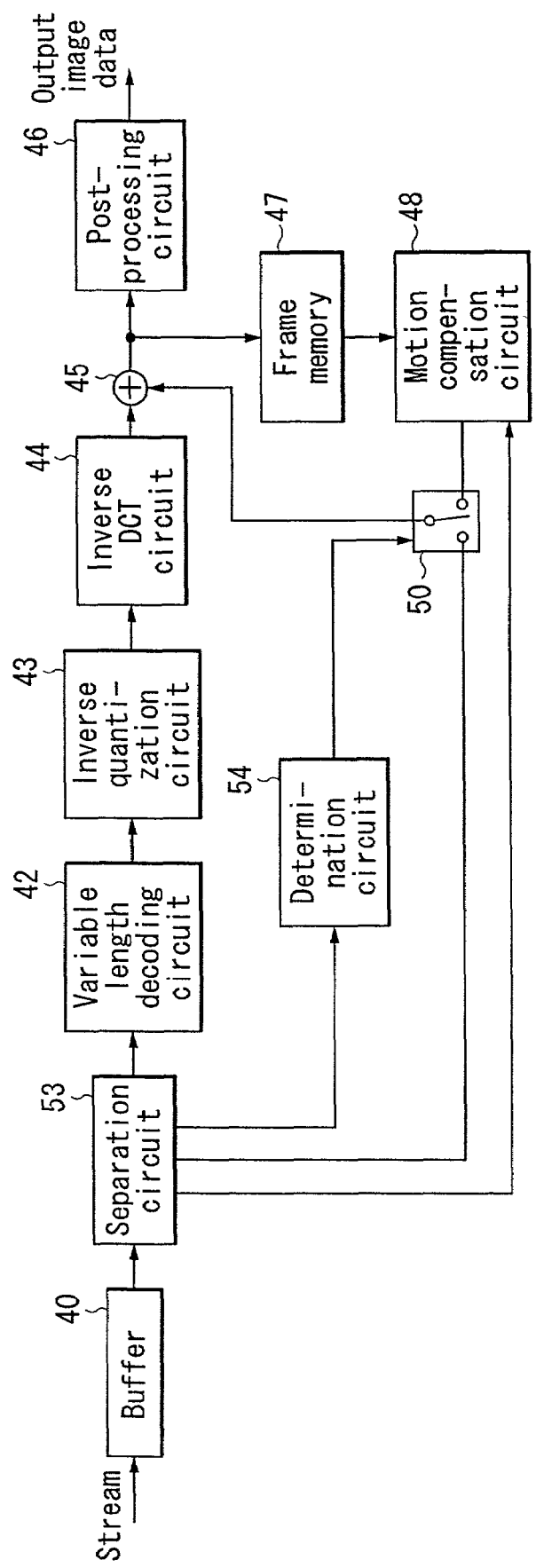
FIG. 9 is a block diagram illustrating a configuration of the decoding circuit illustrated in FIG. 5.

FIG. 9 illustrates a configuration of the decoding circuit 6 illustrated in FIG. 5. The decoding circuit 6 is configured and operates similarly to the decoding circuit 5 illustrated in FIG. 8, except that the decoding process is performed using the reference data contained in the stream held in the buffer 40 when the encoded higher hierarchy image data item Y2 is an intra picture.

More specifically, when the encoded higher hierarchy image data item Y2 is an intra picture, the stream temporarily held in the buffer 40 includes reference data. Therefore, the separation circuit 41 separates the reference data from the stream, and supplies the separated reference data to the switch 50. When the encoded higher hierarchy image data item Y2 is determined as an intra picture by the determination circuit 54, the switch 50 is switched in accordance with the switching signal supplied from the determination circuit 54 so that the reference data separated by the separation circuit 41 is supplied to the addition circuit 45.

Next, the operation of the image decoding apparatus configured as described above will be discussed.

Figure 10:
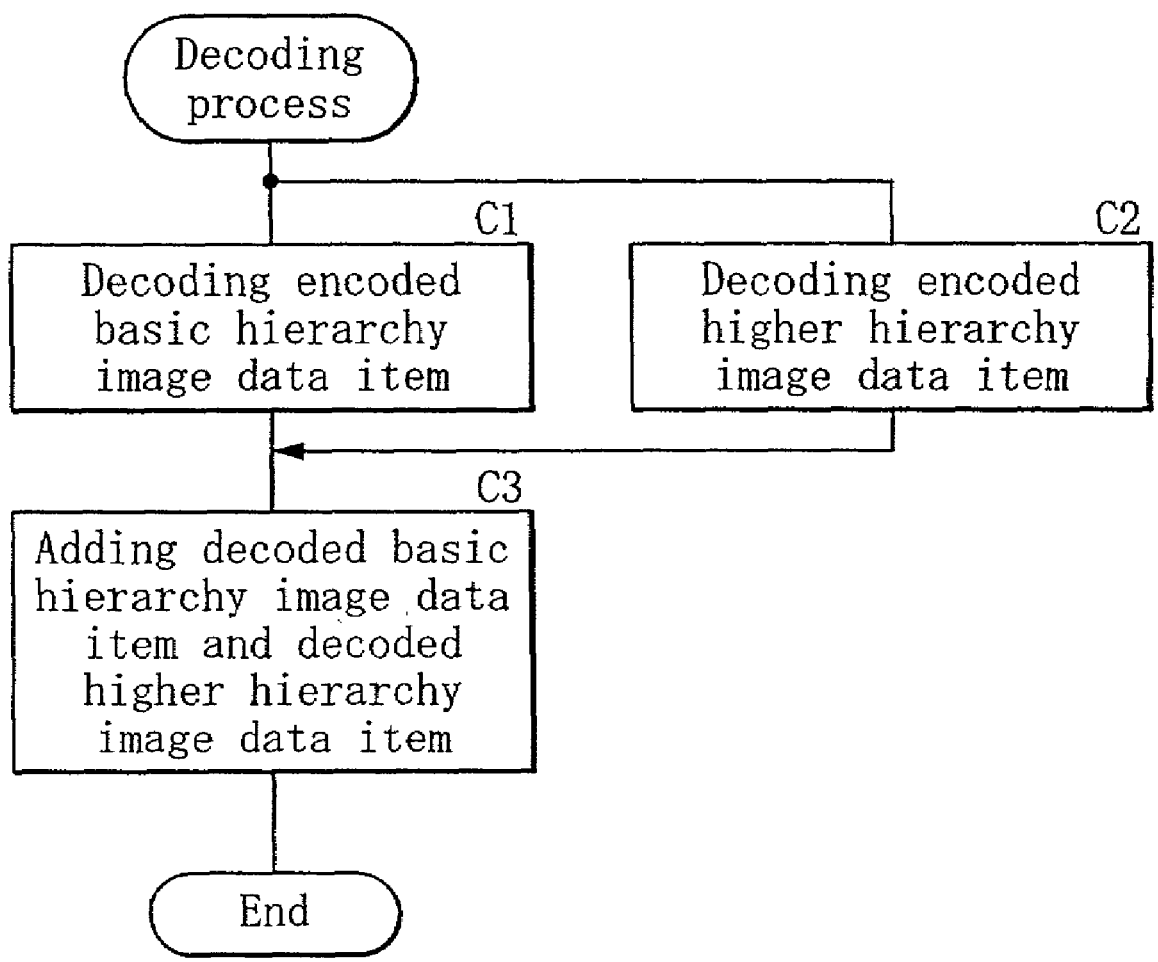
FIG. 10 is a flowchart of a decoding process performed by the image decoding apparatus illustrated in FIG. 5.

FIG. 10 is a flowchart of the decoding process performed by the image decoding apparatus illustrated in FIG. 5. When the stream for the encoded basic hierarchy image data item Y1 is supplied, the decoding circuit 5 decodes the stream to restore the basic hierarchy image data at a step C1. In other words, it causes the buffer 40 to temporarily hold the stream for the encoded basic hierarchy image data item Y1. The separation circuit 41 separates the stream held in the buffer 40. The separation circuit 41 also supplies the motion vector separated from the stream to the motion compensation circuit 48, and the encoded data separated from the stream to the variable length decoding circuit 42.

The variable length decoding circuit 42 performs variable length decoding on the encoded data separated by the separation circuit 41. The inverse quantization circuit 43 performs inverse quantization on the data supplied from the variable length decoding circuit 42. The inverse DCT circuit 44 performs inverse DCT on the data supplied from the inverse quantization circuit 43.

When the encoded basic hierarchy image data item Y1 is determined as an intra picture, the determination circuit 54 switches the switch 49 so that data "0" is supplied to the addition circuit 45. The addition circuit 45 adds the data "0" and the data outputted from the inverse DCT circuit 44, and supplies the addition result to the post-processing circuit 46 and the frame memory 47.

On the other hand, when the encoded basic hierarchy image data item Y1 is determined as a non-intra picture by the determination circuit 54, the motion compensation circuit 48 performs motion compensation on the reference image data stored in the frame memory 47 based on the motion vector separated by the separation circuit 41, and generates reference image data for motion compensation as predictive image data. The determination circuit 54 switches the switch 49 so that the predictive image data outputted from the motion compensation circuit 48 is supplied to the addition circuit 45. The addition circuit 45 adds the predictive image data outputted from the motion compensation circuit 48 and the data outputted from the inverse DCT circuit 44, and supplies the addition result to the post-processing circuit 46 and the frame memory 47.

The post-processing circuit 46 converts the block data in the block scan form, which is the addition result supplied from the addition circuit 45, to image data in the raster scan form, and rearranges and outputs the converted image data in a predetermined order. The output image data is the restored basic hierarchy image data, which is also supplied to the addition circuit 7.

On the other hand, when the stream for the encoded higher hierarchy image data item Y2 is supplied, the decoding circuit 6 decodes the stream to restore the higher hierarchy image data at a step C2. In other words, it causes the buffer 40 to temporarily hold the stream for the encoded higher hierarchy image data item Y2. When the encoded higher hierarchy image data item Y2 is an intra picture, the stream held in the buffer 40 also includes the reference data. Therefore, the separation circuit 41 separates the reference data from the stream, and supplies it to the switch 50.

When the encoded higher hierarchy image data item Y2 is determined as an intra picture, the determination circuit 54 switches the switch 50 so that the reference data is supplied to the addition circuit 45. The addition circuit 45 adds the reference data and the data outputted from the inverse DCT circuit. In other respects, the decoding circuit 6 operates similarly to the decoding circuit 5 to restore and output the higher hierarchy image data to the addition circuit 7.

At a step C3, the addition circuit 7 adds the basic hierarchy image data outputted from the decoding circuit 5 and the higher hierarchy image data outputted from the decoding circuit 6, and restores the addition result as input image data.

As described above, according to this embodiment, encoding is performed on differential image data having a smaller amount of data component and obtained by subtraction using the reference data other than zero even when, for example, higher hierarchy image data, among image data items in a plurality of hierarchies divided in accordance with the hierarchical encoding method, is to be encoded as an intra picture. As a result, the encoding amount of the higher hierarchy image data can be reduced to enhance the encoding efficiency, resulting in improvement in encoding efficiency of the overall input image data. Further, because decoding is performed on the higher hierarchy image data thus encoded based on the reference data, higher hierarchy image data with excellent reproducibility can be obtained.

[Second Embodiment]

Figure 11:
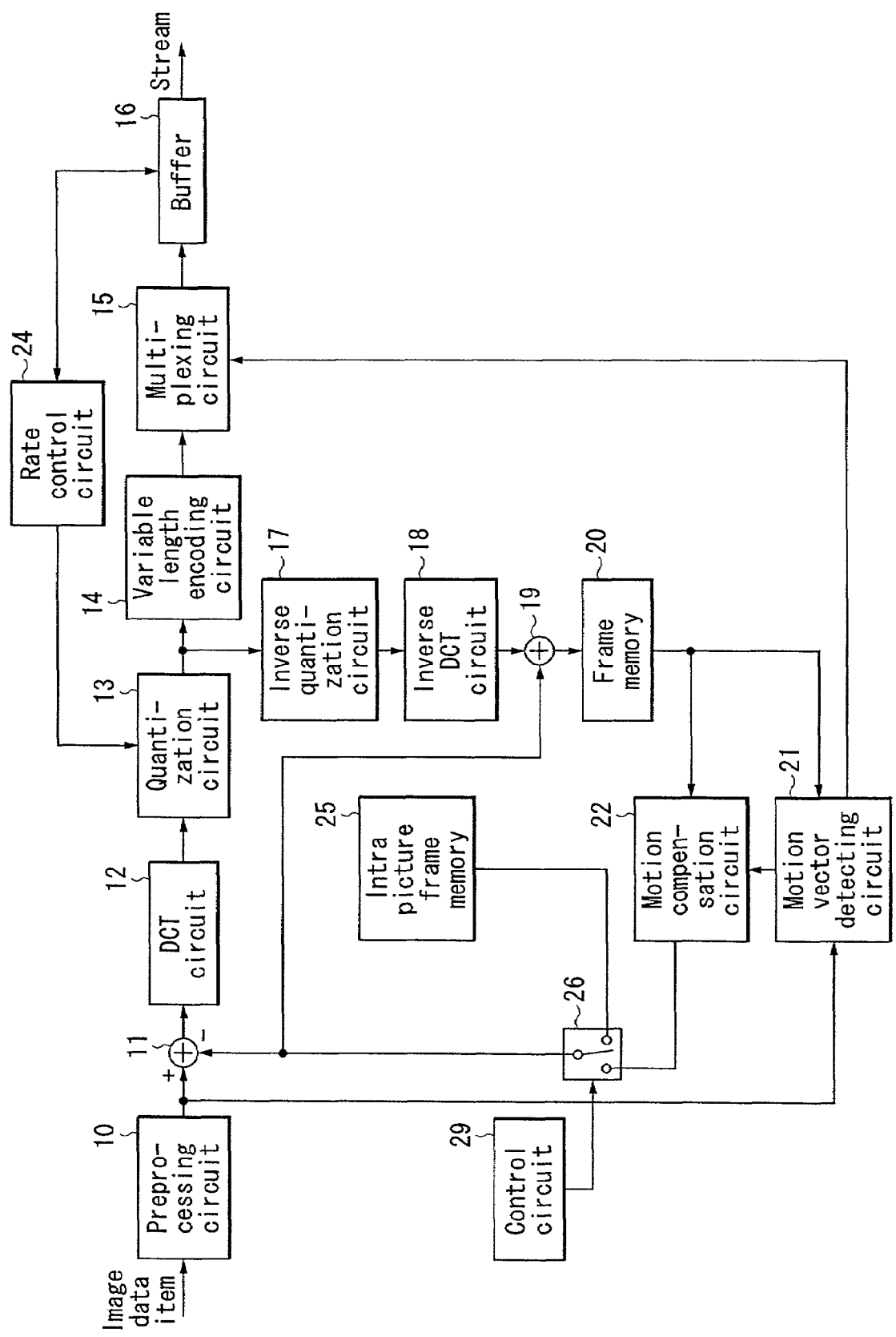
FIG. 11 is a block diagram illustrating a configuration of an encoding circuit of an image encoding apparatus according to a second embodiment of the invention.
Figure 12:
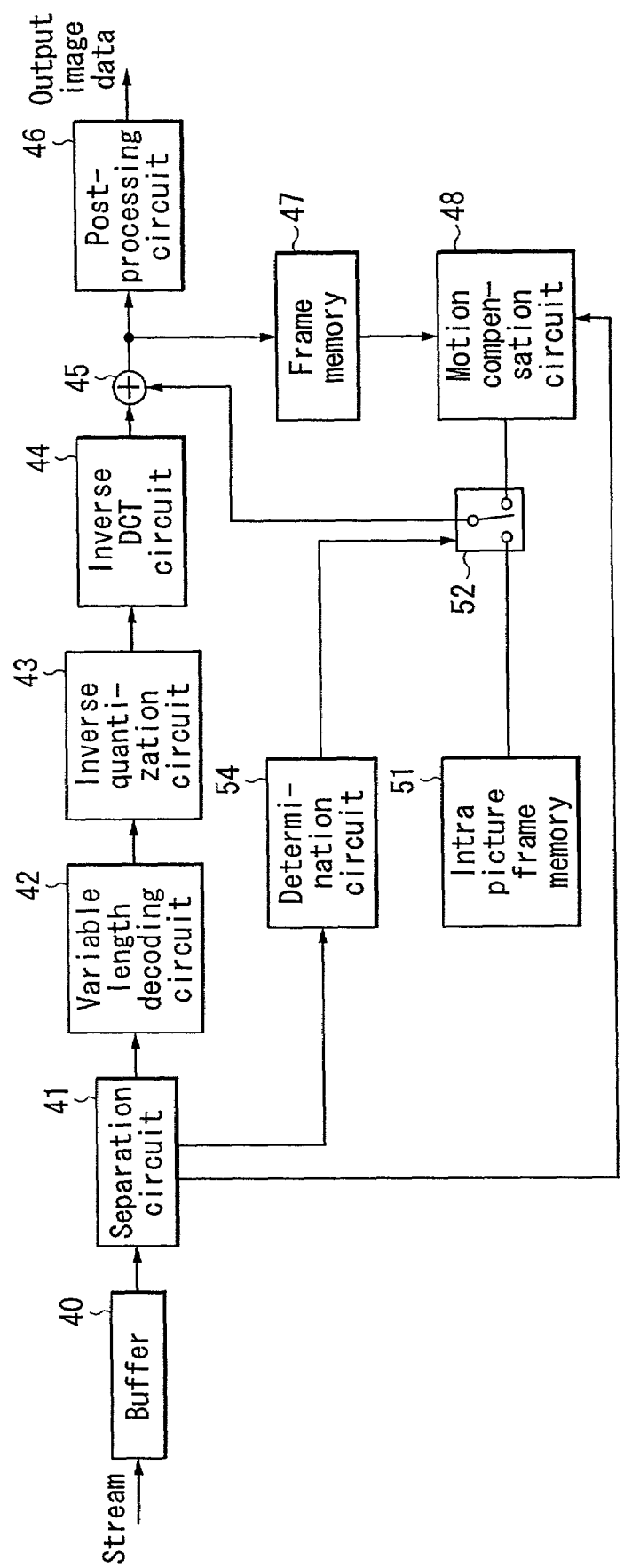
FIG. 12 is a block diagram illustrating a configuration of a decoding circuit of an image decoding apparatus according to a second embodiment of the invention.

FIG. 11 illustrates a configuration of an encoding circuit of an image encoding apparatus according to the present embodiment, and FIG. 12 illustrates a configuration of a decoding circuit of an image decoding apparatus according to the present embodiment. The image encoding apparatus of this embodiment is designed to prestore the reference data used for encoding the higher hierarchy image data as an intra picture. Also, the image decoding apparatus of this embodiment is designed to prestore the reference data used for decoding when the encoded higher hierarchy image data is an intra picture. In the remaining respects, these apparatuses are configured and operated similarly to those of the first embodiment.

The encoding circuit illustrated in FIG. 11 corresponds to the encoding circuit 3 illustrated in FIG. 4, further including an intra picture frame memory 25 designed to encode the higher hierarchy image data. The intra picture frame memory 25 prestores the reference data indicative of a value resulting in the smallest encoding amount when the higher hierarchy image data is encoded. This encoding circuit includes a switch 26 in place of the switch 23.

When the higher hierarchy image data is determined to be encoded as an intra picture in the encoding circuit illustrated in FIG. 11, the control circuit 29 switches the switch 26 so that the reference data prestored in the intra picture frame memory 25 is supplied to the subtraction circuit 11. The subtraction circuit 11 subtracts the reference data from the data outputted from the preprocessing circuit 10 (higher hierarchy image data), thereby producing differential image data. Thereafter, encoding is performed on the differential image data similarly to the first embodiment.

The decoding circuit illustrated in FIG. 12 corresponds to the decoding circuit 6 illustrated in FIG. 4. Compared with the decoding circuit illustrated in FIG. 8, this circuit further includes an intra picture frame memory 51 to decode the encoded higher hierarchy image data. The intra picture frame memory 51 prestores the reference data having the same contents as the reference data stored in the intra picture frame memory 25 provided in the encoding circuit illustrated in FIG. 11. This decoding circuit further includes a switch 52 provided in place of the switch 50.

When the encoded higher hierarchy image data is determined as an intra picture in the decoding circuit illustrated in FIG. 12, the determination circuit 54 switches the switch 52 so that the reference data prestored in the intra picture frame memory 51 is supplied to the addition circuit 45. The addition circuit 45 adds the reference data and the data output from the inverse DCT circuit 44, and supplies the addition result to the post-processing circuit 46 and the frame memory 47. The post-processing circuit 46 restores the intra picture higher hierarchy image data based on the addition result supplied from the addition circuit 45.

As described above, according to the present embodiment, the reference data prestored in the encoding and decoding circuits is used to encode and decode the higher hierarchy image data when the higher hierarchy image data is encoded as an intra picture, and therefore the reference data need not be transmitted from the encoding circuit to the decoding circuit.

While the reference data is prestored in the encoding and decoding circuits in this embodiment, the reference data, for example, may first be encoded when the higher hierarchy image data is to be encoded, and the encoded reference data may first be decoded when the encoded higher hierarchy image data is to be decoded, and stored in the intra picture frame memory in the decoding circuit.

[Third Embodiment]

Figure 13:
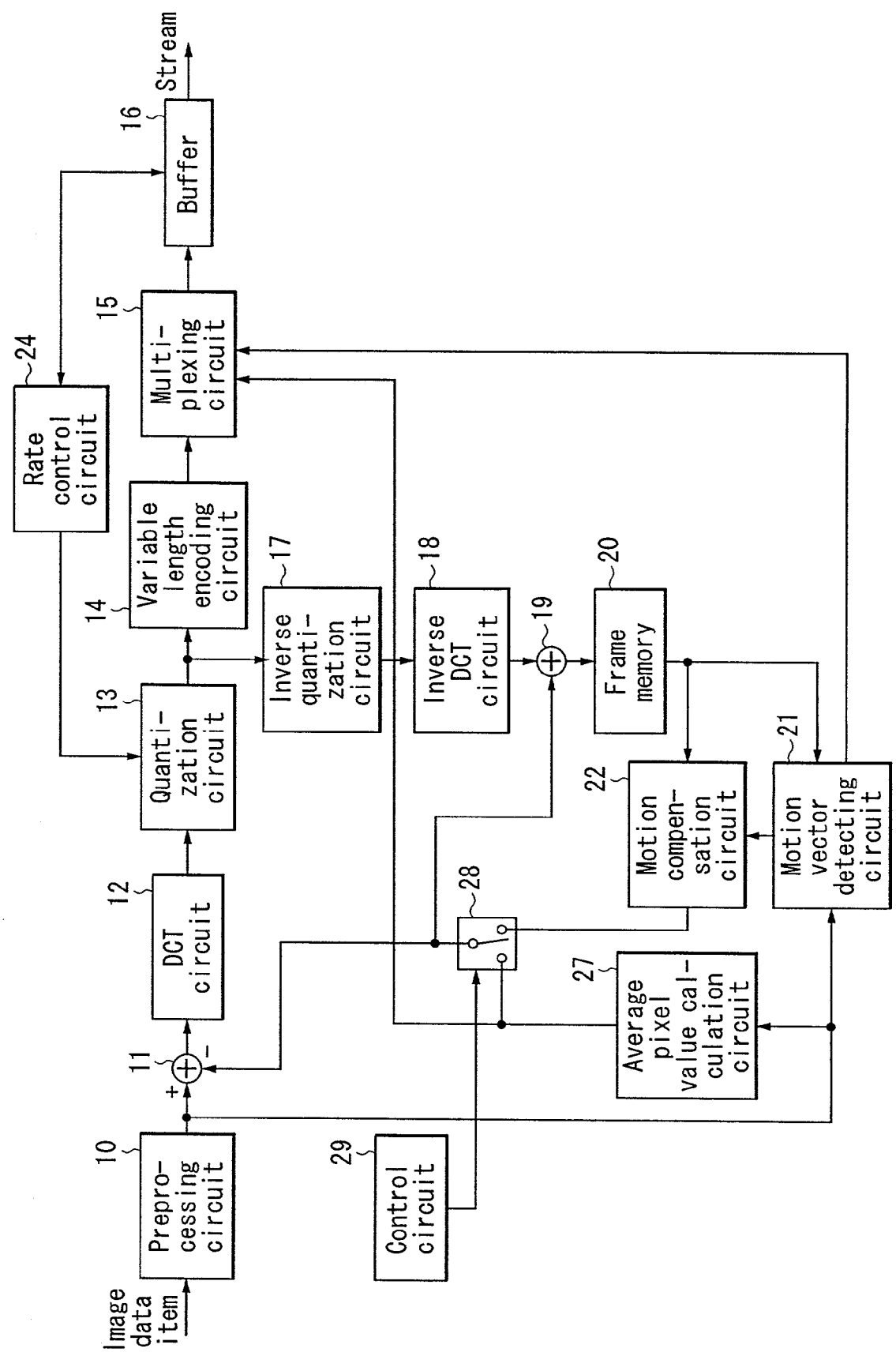
FIG. 13 is a block diagram illustrating a configuration of an encoding circuit of an image encoding apparatus according to a third embodiment of the invention.

FIG. 13 illustrates a configuration of an encoding circuit of an image encoding apparatus according to the present embodiment. The image encoding apparatus of this embodiment is designed to calculate an average pixel value of the higher hierarchy image data as the reference data when the higher hierarchy image data is to be encoded as an intra picture.

The encoding circuit illustrated in FIG. 13 corresponds to the encoding circuit 3 illustrated in FIG. 4. Compared with the encoding circuit illustrated in FIG. 6, the circuit further includes an average pixel value calculation circuit 27 for calculating an average pixel value of the data outputted from the preprocessing circuit 10 (an average value of all pixels in the higher hierarchy image data) to encode the higher hierarchy image data. Further, a switch 28 is provided in this encoding circuit in place of the switch 23.

When the higher hierarchy image data is to be encoded as an intra picture in the encoding circuit illustrated in FIG. 13, the average pixel value calculation circuit 27 calculates an average pixel value of the data outputted from the preprocessing circuit 10 (the higher hierarchy image data). The control circuit 29 switches the switch 28 so that the average pixel value calculated by the calculation circuit 27 is supplied to the subtraction circuit 11. The subtraction circuit 11 subtracts the average pixel value from the data output from the preprocessing circuit 10, thereby producing differential image data. Similarly to the first embodiment, encoding is performed on the differential image data.

The average pixel value calculation circuit 27 supplies the calculated average pixel value to the multiplexing circuit 15, which multiplexes and outputs the average pixel value together with the encoded data of the higher hierarchy image data.

The higher hierarchy image data thus encoded is decoded by the decoding circuit illustrated in FIG. 9. In this case, the separation circuit 53 separates the average pixel value from the stream held in the buffer 40, and supplies the separated average pixel value to the switch 50. As a result, this average pixel value can be used when the encoded higher hierarchy image data, which is an intra picture, is decoded.

As described above, according to the present embodiment, when the higher hierarchy image data is encoded as an intra picture, the average pixel value thereof is calculated and utilized, and the calculated pixel average value is multiplexed and outputted. As a result, the amount of data can be optimally reduced for encoding in accordance with the characteristics of the image data. Further, when the encoded higher hierarchy image data is an intra picture, such data is decoded by using the multiplexed and outputted average pixel value. Consequently, the average pixel value need not be prearranged as the reference data.

While a number of preferred embodiments of the invention have been described above, the present invention is not limited to the above described embodiments, and numerous variations can be made.

For example, while the image data to be encoded is divided into data items in a plurality of hierarchies (the basic hierarchy image data item and the higher hierarchy image data item) in the hierarchy encoding method and the higher hierarchy image data item is encoded using the reference data when it is to be encoded as an intra picture, encoding efficiency can be enhanced by using such reference data when the image data having a smaller amount of data component is encoded as an intra picture.

Further, although encoding is performed on the image data items in the hierarchies obtained by dividing the image data to be encoded for different frequency components, encoding may be performed on the image data items in hierarchies divided, for example, for different color components.

As described above, according to the present invention, when image data to be encoded is divided into image data items in a plurality of hierarchies and the image data item in a given hierarchy among the image data items in the plurality of hierarchies thus divided is to be encoded as an intra picture, the image data item in the given hierarchy is encoded using reference data other than zero, so that encoding efficiency of the image data item in the given hierarchy can be enhanced.

Obviously many modifications and variations of the present invention are possible in the light of the above teachings. It is therefore to be understood that within the scope of the appended claims the invention may be practiced otherwise than as specifically described.

What is claimed is:

1. An image processing apparatus, comprising:
   specific hierarchy encoding means for encoding a specific hierarchy image data item, among image data items in respective hierarchies produced by dividing image data to be encoded, by performing an encoding process for an intra picture, or an encoding process for a non-intra picture;
   average pixel value detecting means for detecting an average pixel value of the specific hierarchy image data item as reference data;
   control means for controlling the encoding process performed by the specific hierarchy encoding means;
   wherein when the encoding process for the intra picture is to be performed, the specific hierarchy encoding means performs the encoding process for the intra picture after subtracting the reference data having a value other than zero from the specific hierarchy image data item; and
   multiplexing means for multiplexing the reference data with an output of the specific hierarchy encoding means.

2. An image processing apparatus according to claim 1, further comprising storage means for storing the reference data.

3. An image processing apparatus according to claim 1, wherein the image data items in hierarchies include a basic hierarchy image data item and a higher hierarchy image data item obtained by subtracting the basic hierarchy image data item from the image data to be encoded, and the specific hierarchy image data item is the higher hierarchy image data item.

4. An image processing apparatus according to claim 3, further comprising higher hierarchy encoding means for encoding the higher hierarchy image data item by performing the encoding process for the intra picture or the encoding process for the non-intra picture, wherein when the encoding process for the intra picture is to be performed, the higher hierarchy encoding means performs the encoding process for the intra picture without subtracting the reference data from the specific hierarchy image data item.

5. An image processing apparatus according to claim 1, further comprising division means for dividing the image data to be encoded to produce the image data items in hierarchies.

6. An image processing apparatus according to claim 1, wherein when the encoding process for the inter picture is to be performed, the specific hierarchy encoding means performs the encoding process for the intra picture after subtracting image data corresponding to a previous frame from the image data item in a given hierarchy.

7. An image processing apparatus, comprising:
   separation means for separating specific hierarchy encoded data item and reference data from a stream in which an output of the specific hierarchy encoded data item and the reference data are multiplexed; the reference data being an average pixel value of the specific hierarchy image data;
   determination means for determining whether the specific hierarchy encoded data item, encoded by performing an encoding process for an intra picture or an encoding process for a non-intra picture on a specific hierarchy image data item among image data items in respective hierarchies produced by dividing image data to be encoded, is encoded by performing the encoding process for the intra picture or the encoding process for the non-intra picture; and
   specific hierarchy decoding means for decoding the specific hierarchy image data item from the specific hierarchy encoded data item based on a result of determination by the determination means,
   wherein when a decoding process for the intra picture is to be performed, the specific hierarchy decoding means performs the decoding process on the specific hierarchy encoded data item using reference data having a value other than zero.

8. An image processing apparatus according to claim 7, further comprising storage means for storing the reference data.

9. An image processing apparatus according to claim 7, wherein the image data items in hierarchies produced by dividing the image data to be encoded include a basic hierarchy image data item and a higher hierarchy image data item obtained by subtracting the basic hierarchy image data item from the image data to be encoded, and the specific hierarchy image data item is the higher hierarchy image data item.

10. An image processing apparatus according to claim 9, further comprising higher hierarchy image decoding means for performing the decoding process for the intra picture or a decoding process for the non-intra picture on the higher hierarchy encoded data item produced by performing the encoding process for the intra picture or the encoding process for the non-intra picture on the higher hierarchy image data item, thereby decoding the higher hierarchy image data item, wherein when the decoding process for the intra picture is to be performed, the higher hierarchy image decoding means performs the decoding process for the intra picture on the higher hierarchy encoded data item without using the reference data.

11. An image processing apparatus according to claim 9, further comprising encoded image decoding means for decoding the image data to be encoded based on the higher hierarchy image data item and the specific hierarchy image data item.

12. An image processing method, comprising the steps of:
dividing image data to be encoded to produce image data items in respective hierarchies;
encoding a specific hierarchy image data item among the image data items in respective hierarchies by performing an encoding process for an intra picture or an encoding process for a non-intra picture;
detecting an average pixel value of the specific hierarchy image data item as the reference data;
wherein when the encoding process for the intra picture is to be performed, the encoding process for the intra picture is performed in the encoding step after subtracting reference data having a value other than zero from the specific hierarchy image data item; and
multiplexing the reference data with an output of the encoding step.

13. An image processing method according to claim 12, wherein the image data items in hierarchies include a basic hierarchy image data item and a higher hierarchy image data item obtained by subtracting the basic hierarchy image data item from the image data to be encoded, and the specific hierarchy image data item is the higher hierarchy image data item.

14. An image processing method, comprising the steps of:
separating specific hierarchy encoded data item and reference data from a stream in which an output of the specific hierarchy encoded data item and the reference data are multiplexed, the reference data being an average pixel value of the specific hierarchy image data;
determining whether the specific hierarchy encoded data item, encoded by performing an encoding process for an intra picture or an encoding process for a non-intra picture on a specific hierarchy image data item among image data items in respective hierarchies produced by dividing image data to be encoded, is encoded by performing the encoding process for the intra picture or the encoding process for the non-intra picture; and
decoding the specific hierarchy image data item from the specific hierarchy encoded data item based on a result of determination in the determining step;
wherein when a decoding process for the intra picture is to be performed, in the step of decoding the specific hierarchy image data item the decoding process is performed on the specific hierarchy encoded data item using reference data having a value other than zero.

15. An image processing method according to claim 14, wherein the image data items in hierarchies include a basic hierarchy image data item and a higher hierarchy image data item obtained by subtracting the basic hierarchy image data item from the image data to be encoded, and the specific hierarchy image data item is the higher hierarchy image data item.

16. An image processing method according to claim 15, further comprising the step of performing the decoding process for the intra picture or a decoding process for the non-intra picture on the higher hierarchy encoded data item produced by performing the encoding process for the intra picture or the encoding process for the non-intra picture on the higher hierarchy image data item, thereby decoding the higher hierarchy image data item, wherein when the decoding process for the intra picture is to be performed, in the step of decoding the higher hierarchy image data item the decoding process for the intra picture is performed on the higher hierarchy encoded data item without using the reference data.

17. An image processing method according to claim 15, further comprising the step of decoding the image data to be encoded based on the higher hierarchy image data item and the specific hierarchy image data item.

* * * * *